Sept. 25, 1973 T. F. McHENRY 3,761,318

EDGE DETECTOR UTILIZING ALL ACTIVE JUNCTION RADIATION THERMOPILES

Filed Dec. 20, 1971

INVENTOR.
THOMAS F. McHENRY
BY Joseph Levinson

United States Patent Office 3,761,318
Patented Sept. 25, 1973

3,761,318
EDGE DETECTOR UTILIZING ALL ACTIVE JUNCTION RADIATION THERMOPILES

Thomas F. McHenry, Norwalk, Conn., assignor to Barnes Engineering Company, Stamford, Conn.

Filed Dec. 20, 1971, Ser. No. 209,550
Int. Cl. H01v *1/00*
U.S. Cl. 136—225 2 Claims

ABSTRACT OF THE DISCLOSURE

A thermopile radiation detector is provided consisting of a series of differential thermocouples with all junctions spaced and thermally insulated from their support, thus making all junctions active. By providing spaced rows of thermopiles with junctions at different intervals, each forming a separate digital channel, a variety of codes can be produced. If a beam of uniform radiance is projected onto the array of detectors, a different signal is generated for each given position of the radiation edge in the field of view of the thermopile. This is useful for edge-detecting applications.

BACKGROUND OF THE INVENTION

This invention relates to thermoelectric devices, and more particularly to radiation thermopiles made up of a series of differential thermocouples with all junctions active. The term "active" means susceptible to change of temperature when exposed to radiation.

Conventional thermopiles are comprised of a series of thermocouples, each of which has an active junction which is exposed to radiation, and a reference junction which is not exposed and is in intimate thermal contact with a metal base or supporting member of high thermal conductivity and capacity (a heat sink). The output of the thermocouple is thus the difference in temperature between its active junction and its reference or passive junction. The active junctions of the thermocouples are generally connected in series, with the voltage output of the thermopile being additive to enhance the voltage output of the device. Thermopiles are quite useful for the detection of infrared radiation, and the fact that they use no bias voltage is among the well-known advantages of the thermopile detector. The present invention utilizes the well-known capabilities of the thermopile, but in a completely different manner than is taught by the prior art, for various edge detecting applications.

It is accordingly an object of the persent invention to provide a new and novel thermopile detector which eliminates the prior active and reference junction construction.

A further object of this invention is to provide a thermopile construction for producing a single, distinctive signal for any one position of the edge of an extended object in the field of view of the thermopile.

A further object is to locate the edge of a beam of radiation moving across the thermopile, independent of the intensity of the beam.

SUMMARY OF THE INVENTION

An all active junction thermopile detector is provided by mounting a series of differential thermocouples on a thin layer of insulating material which in turn is mounted on a support member with the junctions of the thermocouples being spaced from the support member. Accordingly, all of the thermocouple junctions making up the thermopile are thermally insulated from the support member. In performing various edge tracking or locating functions, one or a plurality of spaced rows is provided. The digital number produced by the plurality of rows changes only one digit at a time for a given position of the edge on the thermopile, thus producing a different signal for each position of the radiation edge on the thermopile.

DESCRIPTION OF THE PREFERRED EMBODIMENTS

Figure 1:
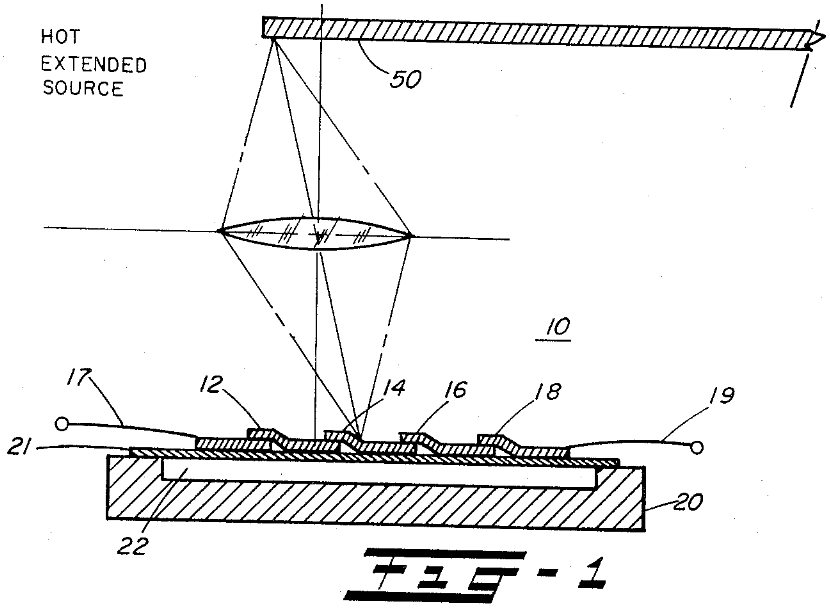
FIG. 1 is an elevational cross-sectional view of the all active junction thermopile embodied in this invention, including an optical means of applying radiation to the thermopile.

Referring now to FIG. 1, the thermopile referred to generally with the reference character 10 is comprised of a series of differential thermocouples 12, 14, 16 and 18, which may be connected to external circuitry by leads 17 and 19. The thermocouples 12, 14, 16 and 18 are mounted on a thin layer of insulating material 21, such as polyethylene terephthalate, sold under the trademark Mylar. The thermopile 10 may be assembled on a support 20 which is spaced from the thermopile junctions and is hollow at 22, so that there is no intimate thermal contact between the thermal junctions and the support member. The support member 20 may be of any suitable material such as metal, so long as the thermopile junctions are spaced therefrom and insulated therefrom. The thermocouples 12, 14, 16 and 18 may be made of any suitable bimetal materials, such as bismuth and antimony. It should be observed that all of the junctions of the thermopile 10 are active and have radiation applied equally thereto from a field of view by a suitable simple optical system as shown in FIG. 1. This represents a drastic departure from conventional thermopile structure in which the thermocouples 12, 14, 16 and 18 would normally consist of an active or hot junction and a reference or passive junction which has the same general temperature as the support 20. By the arrangement shown all junctions are floating and active. Under such a circumstance, if an object from a field of view is imaged onto an equal number of active junctions, no signal output will occur, which represents a "zero." If the edge is moved either way, an odd number of junctions will be exposed and a signal will occur. This is a "one."

Figure 2:
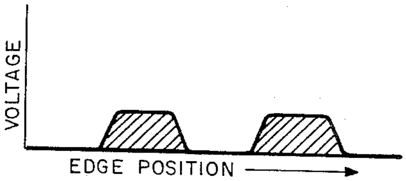
FIG. 2 is an idealized curve of output voltage of the thermopile of FIG. 1 scanned by a radiation edge moving across the thermopile.

FIG. 2 shows the response of the thermopile to a thermal edge of constant radiation as the edge moves across the thermopile. The curve of FIG. 2 suggests the application of the all active junction thermopile 10 for edge detecting and tracking applications. As the object from the field of view is imaged and moves on the thermopile 10, the type of signal output changes, depending on the position of the image of the object from the field of view. Since the output of the thermopile is digital in character, consisting of "zeroes" or "ones," the edge position of an object moving through the field of view may be indicated without the need for computers or any analog interpolation.

To enhance the accuracy, and depending on the accuracy required for a particular application, a plurality of spaced rows of thermocouples of different positioning may be employed. The thermocouples within a given row are arranged to change only one digit at a time, so that only one distinct output digital number is produced for each position of a thermal edge on the thermopile. A gray code is utilized which changes only one digit at a time, and the number of possibilities is $2^{n-1}$ where $n$ is the number of lines of thermocouples employed. The number consisting of all "zeroes" is discarded. This means that all useful numbers will contain at least one "one."

Figure 3:
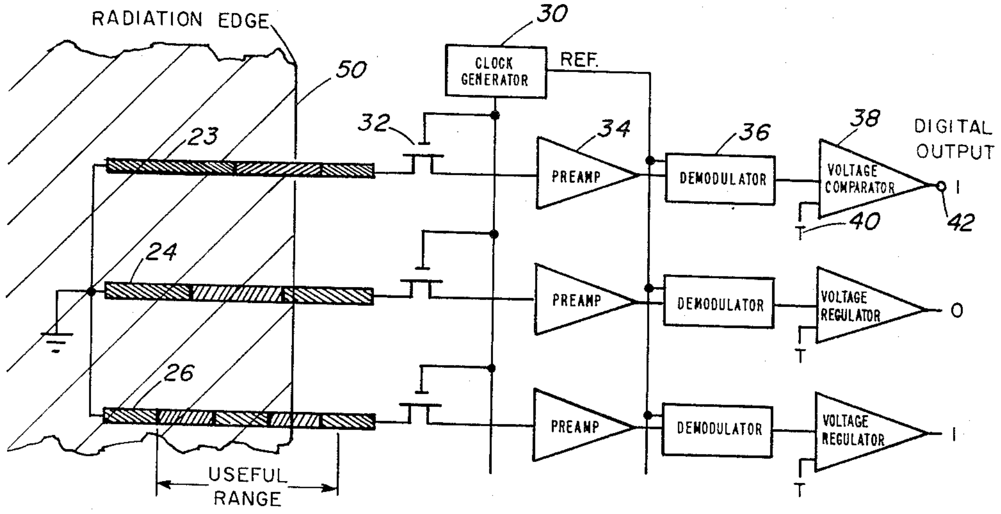
FIG. 3 is a schematic diagram of one form of an edge-locating system utilizing the all active junction thermopile embodied in this invention.

FIG. 3 is a circuit diagram for one type of digital processing circuitry using the all active junction thermopile, which also illustrates the gray code. FIG. 3 illustrates three channels 23, 24, and 26, which contain 2, 2 and 4 active junction thermocouples, respectively. Additional channels with 8, 16, etc. active junctions may be added as desired to improve resolution. Taking one channel 23, on which the thermal edge 50 appears, a clock generator 30 triggers a Mosfet transistor 32 to sample the channel 23, feeding any signal appearing thereon to preamp 34. The output of preamp 34 is fed to a demodulator 36 which is also fed a reference signal from the clock generator 30. The output of the demodulator 36 is fed to a voltage comparator 38 which also has applied thereto a threshold voltage 40. The threshold voltage 40 is to insure that noise generated by the floating thermocouples does not provide an output unless the thermal edge appears thereon. The output of the voltage comparator appears at output terminal 42 in the form of a digital output which is indicated as "one," provided by the positive output of the first thermocouple in channel 23. In channel 24 the thermal edge covers an even number of junctions, producing a "zero" digital output, while in channel 26 the edge covers an odd number of junctions, again producing a "one" digital output. As the edge 50 moves across, one digit changes at a time, producing a coded output which indicates the position of the thermal edge within the field of view of the thermopiles, consisting of the differently spaced thermocouples in the various channels. The gray code illustrated in FIG. 3 was actually developed for six channels containing a total number of 64 active elements. The code is set to change one digit at a time, producing only one distinctive digital output for the combined channels, which indicates the position of the thermal edge on the thermopile. Although not shown, a hold circuit could be provided for the digital outputs so that they may be sampled at given time intervals. The electronic circuitry shown in merely illustrative, and it may not be necessary in all applications to provide individual channels. Only where the radiation is low in intensity and the channels containing many junctions provide too high a resistance would separate preamplifiers be necessary. The exact number of thermocouples in the thermopile, as well as the number of rows employed, would depend on the application and accuracy required for an edge tracking function. As was pointed out, the gray code offers a wide choice of possible configurations.

The essential element in the system, however, is the all active junction thermopile which has no moving parts, the image of the thermal edge being applied by a suitable optical system on the focal plane of the thermopile. The simplicity of the system, requiring no scanning, lends itself to all types of edge-detecting applications, such as horizon sensing, edge tracking, and even alarm-type systems.

The all active junction thermopile can detect the position of the edge of a radiant body even when the radiance is non-unifiorm. All that is required is that the variations between junctions be small compared to the difference between the radiance edge and the background.

Since other modifications and changes varied to fit particular operating requirements and environments will be apparent to those skilled in the art, this invention is not considered limited to the examples chosen for purposes of disclosure, and covers all changes and modifications which do not constitute departures from the true spirit and scope of this invention.

What is claimed is:

1. An edge detector utilizing all active junction thermopiles for generating a plurality of distinctive digital outputs in accordance with the position of a thermal edge imaged thereon, comprising (a) a plurality of spaced rows of thermocouple junctions formed of two dissimilar metals on a thin layer of insulating material with the two dissimilar metals alternately disposed to form opposed junctions which are serially connected to form a thermopile in each of said plurality of rows, (b) support means carrying said thin layer of insulating material and said thermopiles with the junctions of said thermopiles spaced from said support means such that all the junctions are active, thus responding to radiation imaged thereon, (c) each of the thermocouple junctions in said rows having different spacings than the junctions in other rows such that a distinctive digital output occurs from each row based on the position of an image of a thermal edge thereon, and (d) means for imaging a thermal edge on said thermopiles for providing a digital code from said thermopiles for locating the position of the thermal edge.

2. The edge detector set forth in claim 1 having a means for sampling the output of each of said thermopiles to produce a digital code which differs in accordance with the portion of the image of the thermal edge on said thermopile.

References Cited

UNITED STATES PATENTS

| | | | |
|---|---|---|---|
| 3,164,721 | 1/1965 | Astheimer | 250—83.3 H |
| 3,293,082 | 12/1966 | Browner et al. | 136—212 X |
| 3,304,425 | 2/1967 | Astheimer | 250—83.3 H |
| 3,354,309 | 11/1967 | Volkovisky | 136—213 |
| 3,424,624 | 1/1969 | Villers et al. | 136—213 |

CARL D. QUARFORTH, Primary Examiner

E. E. LEHMANN, Assistant Examiner

U.S. Cl. X.R.

136—213; 250—83.3 H